United States Patent
Boesjes

(10) Patent No.: US 8,712,863 B1
(45) Date of Patent: Apr. 29, 2014

(54) APPARATUS AND METHODS FOR INVENTORY, SALE, AND DELIVERY OF DIGITALLY TRANSFERABLE GOODS

(71) Applicant: Amazon Technologies, Inc., Reno, NV (US)

(72) Inventor: Eimar M Boesjes, Eugene, OR (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/842,979

(22) Filed: Mar. 15, 2013

Related U.S. Application Data

(63) Continuation of application No. 13/425,319, filed on Mar. 20, 2012, now Pat. No. 8,571,949, which is a continuation of application No. 10/950,366, filed on Sep. 24, 2004, now Pat. No. 8,140,398, which is a continuation of application No. 09/123,778, filed on Jul. 28, 1998, now Pat. No. 6,799,165.

(51) Int. Cl.
G06Q 99/00 (2006.01)
(52) U.S. Cl.
USPC ..... 705/26.1; 705/26.7; 705/26.8; 705/26.81; 705/26.9; 705/27.1; 705/27.2; 705/28
(58) Field of Classification Search
USPC ......... 705/26.1, 26.7, 26.8, 26.81, 26.9, 27.1, 705/27.2, 28
See application file for complete search history.

(56) References Cited

U.S. PATENT DOCUMENTS

| | | | |
|---|---|---|---|
| 3,718,906 A | 2/1973 | Lightner | |
| 4,528,643 A | 7/1985 | Freeny, Jr. | |
| 4,799,156 A | 1/1989 | Shavit et al. | |
| 5,291,554 A | 3/1994 | Morales | |
| 5,445,295 A | 8/1995 | Brown | |
| 5,640,193 A | 6/1997 | Wellner | |
| 5,684,963 A | 11/1997 | Clement | |

(Continued)

FOREIGN PATENT DOCUMENTS

| | | | |
|---|---|---|---|
| EP | 845749 | | 6/1998 |
| EP | 845749 A2 | * | 6/1998 |
| JP | 2004096749 | | 3/2004 |
| JP | 2004096749 A | * | 3/2004 |

OTHER PUBLICATIONS

Alderman, John; "IUMA Bets on Liquid Audio"; Wired News; published online Mar. 13, 1997; http:/lweb.archive.org/web/19981207014 7 4 7 /www.wired.com/news/culture/story/2533.html, 1 page.

(Continued)

Primary Examiner — Akiba Allen
(74) Attorney, Agent, or Firm — Lee & Hayes, PLLC

(57) ABSTRACT

A system comprises: (a) storage and distribution means; (b) inventory upload means; (c) product information download means; (d) order upload means; and (e) delivery download means. A method comprises: (a) digitally transferring the goods and pertinent product information from a provider of the goods to a storage and distribution means; (b) storing the goods, pertinent product information, order information, sales information, or marketing information on the storage and distribution means; (c) digitally transferring product information to a shopper; (d) digitally transferring order information from a buyer of goods to the storage and distribution means; and (e) digitally transferring the goods to the buyer. The storage and distribution means may be provided with a network connection for access by providers, shoppers, and buyers.

20 Claims, 12 Drawing Sheets

(56) References Cited

U.S. PATENT DOCUMENTS

| | | | |
|---|---|---|---|
| 5,694,546 | A | 12/1997 | Reisman |
| 5,699,526 | A | 12/1997 | Siefert |
| 5,710,887 | A | 1/1998 | Chelliah et al. |
| 5,727,065 | A | 3/1998 | Dillon |
| 5,729,594 | A | 3/1998 | Klingman |
| 5,729,741 | A | 3/1998 | Liaguno et al. |
| 5,745,879 | A | 4/1998 | Wyman |
| 5,774,687 | A | 6/1998 | Nakamura et al. |
| 5,781,911 | A | 7/1998 | Young et al. |
| 5,790,935 | A | 8/1998 | Payton |
| 5,794,217 | A | 8/1998 | Allen |
| 5,799,285 | A | 8/1998 | Klingman |
| 5,809,144 | A | 9/1998 | Sirbu et al. |
| 5,809,145 | A | 9/1998 | Slik et al. |
| 5,845,263 | A * | 12/1998 | Camaisa et al. ........... 705/15 |
| 5,860,068 | A | 1/1999 | Cook |
| 5,950,172 | A | 9/1999 | Klingman |
| 5,950,173 | A | 9/1999 | Perkowski |
| 5,978,775 | A | 11/1999 | Chen |
| 5,991,374 | A | 11/1999 | Hazenfield |
| 6,119,229 | A | 9/2000 | Martinez et al. |
| 6,226,618 | B1 | 5/2001 | Downs et al. |
| 6,330,586 | B1 | 12/2001 | Yates et al. |
| 6,332,146 | B1 | 12/2001 | Jebens et al. |
| 6,385,596 | B1 * | 5/2002 | Wiser et al. ............. 705/51 |
| 6,799,165 | B1 | 9/2004 | Boesjes |
| 7,386,473 | B2 | 6/2008 | Blumenau |
| 8,140,398 | B1 | 3/2012 | Boesjes |
| 2001/0002204 | A1 * | 5/2001 | Jebens et al. ......... 375/240.01 |
| 2001/0047349 | A1 * | 11/2001 | Easty et al. ............. 707/3 |
| 2003/0149737 | A1 * | 8/2003 | Lambert et al. ......... 709/214 |
| 2006/0116924 | A1 | 6/2006 | Angles et al. |
| 2010/0217994 | A1 | 8/2010 | Ginter et al. |

OTHER PUBLICATIONS

Office action for U.S. Appl. No. 11/272,200, mailed on May 10, 2013, Boesjes, "Apparatus and methods for inventory, sale, and delivery of digitally transferable music or other audio", 31 pages.

U.S. Appl. No. 11/272,200, filed Nov. 9, 2005, Eimar M. Boesjes, "Apparatus and methods for inventory, sale, and delivery of digitally transferable music or other audio".

U.S. Appl. No. 11/333,926, filed Jan. 17, 2006, Eimar M. Boesjes, "Apparatus and methods for inventory, sale, and delivery of digitally transferable music or other audio".

U.S. Appl. No. 11/930,188, filed Oct. 31, 2007, Eimar M. Boesjes, "Apparatus and methods for inventory, sale, and delivery of digitally transferable music or other audio".

U.S. Appl. No. 11/930,190, filed Oct. 31, 2007, Eimar M. Boesjes, "Apparatus and methods for inventory, sale, and delivery of digitally transferable music or other audio".

U.S. Appl. No. 13/425,319, filed Mar. 20, 2012, Eimar M. Boesjes, "Apparatus and methods for inventory, sale, and delivery of digitally transferable goods".

"CONNECT Announces One Server Digital Product Distribution System; PhotoDisc First to Use Groundbreaking Solution"; Business Wire Sep. 27, 1995.

"Digital River Database Now Holds World's Largest INventory of INternet-Delivered Software Products"; PR Newswire Jan. 12, 1998.

"Digital River Signs Online Software Distribution Partnership With Value America"; Business Wire Aug. 20, 1998.

Freund, Jesse; "Garage Bands Go Global"; Wired Magazine; Issue 5.02 (Feb. 1997) publlished online; http://www.wired.com/wired/archive/5.02/beta.html.

Liquid Audio; "Liquid Audio Delivers First Solution for Internet Music Commerce"; online press release Mar. 10, 1997; http://web.archive.org/web/19970329002811/www.liquidaudio.com/readon/PR/1 ohpr.html.

CNET News; "Liquid Audio vies to provide music"; publlished online Nov. 7, 1996; http://news.cnet.com/Liquid-Audio-vies-to-provide-music/21 00-1 023_3-244880.html.

"New Product—Entry Form" found at http://www.virtualsoftware.com/publisher/newprodform.cfm (requires username and password).

"Publisher Sign-up and Sales Agreement" found at http://www.virtualsoftware.com/publisher/pubsignup.htm.

Liquid Audio; "The Tools"; online information Feb. 4, 1997; http://web.archive.org/web/19970329002024/www.liquidaudio.com/thetools/index.html.

"The Virtual Software Store Publisher Information Page" found at http://www.virtualsoftware.com/pubinfo.cfm.

"The Virtual Software Store Welcome Page" found at http://www.virtualsoftware.com/.

Transcripts of emails exchanged by Applicant and system administrator of the Virtual Software Store as Applicant registered as a provider (9 pages).

"Welcome to the Virtual Software Store Publisher Support Page Main Menu" found at http://www.virtualsoftware.com/publisher/PubMenu.cfm (requires username and password).

Final Office Action for U.S. Appl. No. 11/272,200, mailed on Oct. 17, 2013, Eimar M. Boesjes, "Apparatus and methods for inventory, sale, and delivery of digitally transferable music or other audio", 31 pages.

* cited by examiner

APPARATUS AND METHODS FOR INVENTORY, SALE, AND DELIVERY OF DIGITALLY TRANSFERABLE GOODS

RELATED APPLICATIONS

This application is a continuation of U.S. non-provisional application Ser. No. 13/425,319 entitled "Apparatus and methods for inventory, sale, and delivery of digitally transferable goods," filed on Mar. 20, 2012 in the name of Eimar M. Boesjes, which is a continuation of U.S. non-provisional application Ser. No. 10/950,366 entitled "Apparatus and methods for inventory, sale, and delivery of digitally transferable goods", filed on Sep. 24, 2004 in the name of Eimar M. Boesjes (now U.S. Pat. No. 8,140,398), which is a continuation of U.S. non-provisional application Ser. No. 09/123,778 entitled "Apparatus and methods for inventory, sale, and delivery of digitally transferable goods", filed on Jul. 28, 1998 in the name of Eimar M. Boesjes (now U.S. Pat. No. 6,799,165), each of the applications being hereby incorporated by reference as if fully set forth herein.

BACKGROUND

The field of the present invention relates to commerce by digital transfer. In particular, apparatus and methods are described herein for inventory, sale, and delivery of digitally transferable goods.

Commerce conducted electronically, over the world-wide computer network known as the Internet, is a relatively recent phenomenon that has nevertheless grown into an important segment of the economy. A shopper or buyer with network access may find information for a product, and submit an order request over the network. The vendor then ships the item, and the buyer pays for the merchandise by standard means (credit card, check, invoice, debit, etc.). The ability to shop for and buy products from any location having network access, including one's home or place of business, has and will continue to revolutionize commerce in the coming years.

However, at present, many systems for conducting such commerce are merely marketing and order-taking systems, with product information available for download by a shopper or buyer, means for a buyer to digitally transmit an order request, possibly including a credit card number or other payment authorization. Most goods must be delivered by more traditional means, and inventory is independent of the order-taking system. In addition, buyers and shoppers are usually restricted to view product information and purchase goods from one vendor (or provider) of goods at a time. For example, an Internet site at http://www1.viaweb.com/stores/ provides access to a variety of providers of products. By entering the area of a provider, the shopper has access to product information from that provider only, and may only order products from that provider. The orders are transmitted from the network site to the provider, who actually fills the order and receives payment. A similar procedure is used at an Internet site at http://www.amazon.com. Books and recorded music are marketed and sold at this site, with the order being transmitted over the Internet, and goods are shipped and payment received. At an Internet site at http://www.ebay.com, items are offered for auction by the public, and information about the item is available for viewing or download. Buyers transmit bids over the Internet, and the system at the site administers the bidding and determines the winning bid. The winning bidder and seller are then put into direct contact to arrange for shipping and payment.

But even items potentially deliverable digitally (stocks, bonds, tickets, reservation) are still delivered physically, perhaps with a receipt or order confirmation delivered electronically. A network site at http://www.discoverbrokerage.com allows submission of "buy" and "sell" requests for stocks and mutual funds. The network site merely processes the requests, but does not execute the trades. Several airlines offer electronic tickets over the Internet (i.e., e-tickets). Once again, only the order and payment are handled by digital transfer over the network. A receipt may be provided electronically, but the goods (in this case, a boarding pass) must still be obtained in person at the airport.

In none of these network sites is there on-site storage of digitally transferable inventory of goods for immediate delivery of purchased goods over the network. In many of these systems the providers must perform their own marketing, collect their own funds, store their own inventory, and manage access to their network-based information.

Therefore, it is desirable to provide apparatus and methods for commerce by digital transfer providing shopper access to products from a plurality of providers simultaneously. It is desirable to provide apparatus and methods for commerce by digital transfer allowing purchase of goods from a plurality of providers in a single order. It is desirable to provide apparatus and methods for commerce by digital transfer which allow providers to immediately upload and store, and/or modify previously stored, digitally transferable goods and product information pertaining thereto, and to receive detailed marketing and sales information. It is desirable to provide apparatus and methods for commerce by digital transfer in which marketing, collections, inventory storage, and access management for a plurality of providers may be handled by a single system. It is desirable to provide apparatus and methods for commerce by digital transfer which allow a buyer to immediately download purchased goods.

SUMMARY

Certain aspects of the present invention may overcome one or more aforementioned drawbacks of the previous art and/or advance the state-of-the-art of apparatus and methods for commerce by digital transfer, and in addition may meet one or more of the following objects:

To provide apparatus and methods for inventory, sale, and delivery of digitally transferable goods;

To provide apparatus and methods for inventory, sale, and delivery of digitally transferable goods wherein goods from a plurality of providers are available from a storage and distribution means;

To provide apparatus and methods for inventory, sale, and delivery of digitally transferable goods wherein a provider may establish a provider account and may upload and/or modify goods and product information to the storage and distribution means;

To provide apparatus and methods for inventory, sale, and delivery of digitally transferable goods wherein provider access to the storage and distribution means is provided by a network connection;

To provide apparatus and methods for inventory, sale, and delivery of digitally transferable goods wherein a provider account is verified and access thereto is restricted by provider account identification data and/or a provider password, and the provider account identification data and/or provider password may be transmitted to a provider electronic mail address;

To provide apparatus and methods for inventory, sale, and delivery of digitally transferable goods wherein provider activity is logged;

To provide apparatus and methods for inventory, sale, and delivery of digitally transferable goods wherein a provider may access logged marketing and/or sales information;

To provide apparatus and methods for inventory, sale, and delivery of digitally transferable goods wherein a network connection to the storage and distribution means provides shopper access to product information;

To provide apparatus and methods for inventory, sale, and delivery of digitally transferable goods wherein the product information is stored in the storage and distribution means in a searchable format, and a shopper may simultaneously search the product information of a plurality of providers;

To provide apparatus and methods for inventory, sale, and delivery of digitally transferable goods wherein shopper identification and/or search information is logged as marketing information;

To provide apparatus and methods for inventory, sale, and delivery of digitally transferable goods wherein a network connection to the storage and distribution means allows a buyer to upload order information;

To provide apparatus and methods for inventory, sale, and delivery of digitally transferable goods wherein the buyer may purchase goods from a plurality of providers in a single order;

To provide apparatus and methods for inventory, sale, and delivery of digitally transferable goods wherein order identification information and/or an order password are sent to a buyer electronic mail address, and are required for buyer confirmation of the order;

To provide apparatus and methods for inventory, sale, and delivery of digitally transferable goods wherein buyer identification and/or financial information are verified prior to delivery of the purchased goods;

To provide apparatus and methods for inventory, sale, and delivery of digitally transferable goods wherein a network connection to the storage and distribution means allows a buyer to download the purchased goods;

To provide apparatus and methods for inventory, sale, and delivery of digitally transferable goods wherein the purchased goods are placed in an order location, and the order identification information and/or the order password are required for the buyer to download the purchased goods;

To provide apparatus and methods for inventory, sale, and delivery of digitally transferable goods wherein buyer identification and/or purchase information is logged as sales information;

To provide apparatus and methods for inventory, sale, and delivery of digitally transferable goods wherein a buyer may return previously purchased goods;

To provide apparatus and methods for inventory, sale, and delivery of digitally transferable goods wherein the provider upload of goods and/or product information, shopper search and download of product information, buyer upload of order information, and/or buyer download of goods may be performed in a single temporally continuous session, or in a plurality of temporally discontinuous sessions; and To provide apparatus and methods for inventory, sale, and delivery of digitally transferable goods wherein one or more of the foregoing procedures may be automated.

One or more of the foregoing objects may be achieved in the present invention by an apparatus comprising: a) a storage and distribution means; b) an inventory upload means; c) a product information download means; d) an order upload means; and e) a delivery download means. One or more of the foregoing objects may be achieved in the present invention by a method comprising the steps of: (a) digitally transferring the goods and product information pertaining thereto from a provider of the goods to a storage and distribution means; (b) storing the goods, product information pertaining thereto, order information, and possibly sales information and marketing information on the storage and distribution means; (c) digitally transferring the product information to a shopper; (d) digitally transferring order information from a buyer of the goods to the storage and distribution means; and (e) digitally transferring the goods to the buyer. The storage and distribution means may be used to store digitally transferable goods, product information pertaining thereto, marketing information, and sales information. The storage and distribution means may be provided with one or more network connections, thereby allowing access by providers, shoppers, and buyers. A provider may establish a provider account, thereby allowing the provider access to the storage and distribution means to: a) upload and/or modify goods and/or product information; and/or b) access to marketing and/or sales information pertaining to goods of the provider. Goods and product information from a plurality of providers may be stored, preferably in a searchable form. The product information from a plurality of providers may be searched simultaneously by a shopper, and goods from a plurality of providers may be ordered by and delivered to a buyer in a single order.

Identification and validation are required for both providers and buyers. Upon establishing a provider account, a provider must supply identification and/or financial information, preferably including an electronic mail address. After verification of the information provided, provider account identification data and/or a provider password may be sent to the provider electronic mail address, and may be required for subsequent access to the provider account. In this way the electronic mail address of the provider is also verified. Similarly, upon placing an order a buyer must supply identification and/or financial information, preferably including an electronic mail address. Order identification data and/or an order password may be sent to the buyer electronic mail address for confirmation. Order confirmation and/or verification of the financial information is provided, and the purchased goods are placed in an order storage area. The order identification information and/or order password may be required for subsequent buyer access to the order storage area and download of the purchased goods by the buyer. In this way the electronic mail address of the buyer may be verified. The order identification data and/or order password may be required for later return of goods by the buyer.

Identification data may be logged for all providers, shoppers, and buyers that access the storage and distribution means. These identification data may include name, physical mail address, electronic mail address, and/or date/time/network address. Search information for shoppers may be logged as marketing information, and order information for buyers may be logged as sales information. Provider, shopper, and/or buyer identification data may be used by an administrator of the apparatus to track usage and to detect and/or prevent fraudulent access to the goods, product information, marketing information, and/or sales information. The marketing and/or sales information may be stored for later access by the provider of the goods and/or product information searched, requested, downloaded, and/or ordered, thereby allowing the provider to track interest in and demand for goods and product information. The marketing and sales information may be stored for later access by the buyer of the goods and/or product information searched, requested, downloaded, and/or ordered, thereby allowing the buyer to track searches and purchases. The sales and/or marketing information may be stored for later access by the system administrator.

Additional objects and advantages of the present invention may become apparent upon referring to the preferred and alternative embodiments of the present invention as illustrated in the drawings and described in the following written description and/or claims.

DETAILED DESCRIPTION OF EMBODIMENTS

Figure 1:
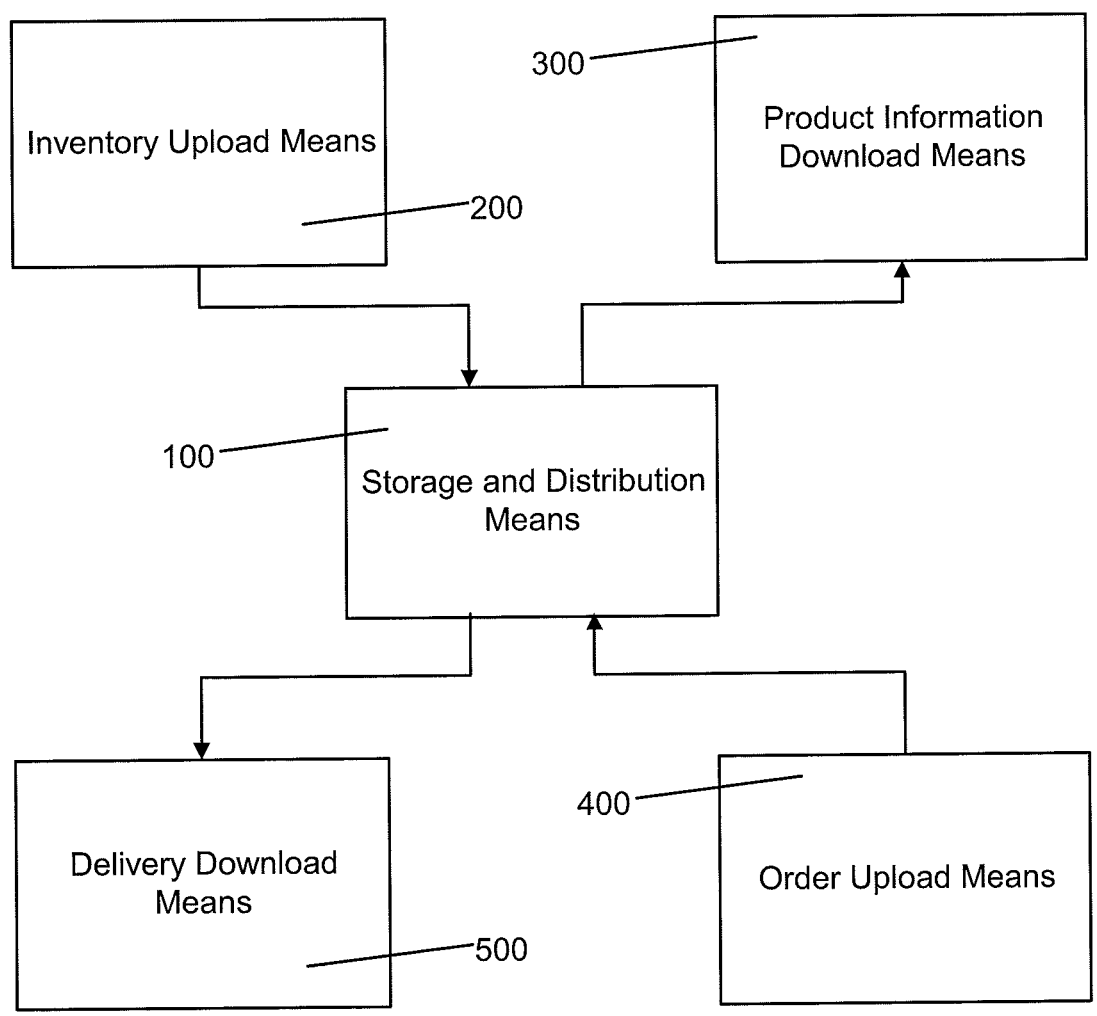
FIG. 1 shows a block diagram of an apparatus for inventory, sale, and delivery of digitally transferable goods according to the present invention.

For purposes of the present written description and/or claims, "digitally transferable goods" shall denote any objects or data which may be digitally encoded and transferred electronically. These may include, but are not limited to, computer files, computer programs, executable code, object code, source code, data, databases, images, music, sounds, 3D models, software, text, books, sheet music, video, film, tickets (travel, transportation, lodging, sports, entertainment, etc.), reservations (travel, transportation, lodging, sports, entertainment, etc.), currency, stocks, financial and/or investment instruments, services, combinations thereof, and/or functional equivalents thereof. Sale of such digitally transferable goods may encompass sale and transfer of a sole extant copy of the digitally transferable material, but may also be construed as sale of a license to use the goods. Different license terms for the same item may be offered by a provider at differing prices. It is also intended that "provider", "shopper", and "buyer" may refer to a plurality of each, and the apparatus and methods disclosed herein may be accessed and/or utilized by multiple providers, shoppers, and/or buyers simultaneously. Alternatively stated, the apparatus and methods disclosed herein may support a plurality of simultaneous provider, shopper, and/or user "sessions". A single provider, shopper, and/or buyer may establish a plurality of concurrent sessions of access and/or use of the system, and a single entity may establish concurrent sessions of different types (for example, concurrent provider and buyer sessions).

For purposes of the present written description and/or claims, any of the terms "storage and distribution means", "inventory upload means", "product information download means", "order upload means", "delivery download means", and any other "means" described herein shall denote any apparatus, hardware, software, and/or combination thereof capable of performing the specified functions, including but not limited to one or more computers, servers, server software, browser software, user interface hardware and/or software, terminals, networked devices, the Internet, the World Wide Web, an intranet, an extranet, modems, memory units, storage devices, distributed computing resources, integrated circuits, ASICs, functional equivalents thereof, and/or combinations thereof. For purposes of the present written description and/or claims, any medium suitable for storage of digitally encoded information, or any combination of or functional equivalent of such media, may be utilized for any of the various storage functions described herein. For purposes of the present written description and/or claims, the term "network connection" shall encompass any apparatus, hardware, software, and/or combination thereof capable of providing any of the various connections described herein, including but not limited to an Internet connection, an Internet service provider (ISP), browser software, user interface hardware and/or software, a modem hook-up, a cable, a phone line, a satellite link, a wireless link, a microwave link, television, a BBS system, a local area network, a wide area network, an intranet, an extranet, direct linkage of a plurality of computers, connections between devices within a single computer, terminal connections, program instructions, multiple user accounts on a single computer, multiple storage areas on a single computer, combinations thereof, functional equivalents thereof, and future systems and protocols for performing analogous functions. Similarly, the term "electronic mail" shall denote the currently standard manner of transmitting and receiving text, data, and other digitally encoded material over a computer network, but shall also be construed to encompass future systems and protocols for performing these and/or analogous functions.

For purposes of the present written description and/or claims, "date/time/network address" shall denote the combination of date, time, and network address (IP address, for example) of any particular session of provider, shopper, or buyer interaction with the apparatus and/or methods described herein. The terms "product information", "sales information", and "marketing information" shall include, but are not limited to, one or more of items listed in the exemplary database structures shown in the block diagrams of FIGS. 10 and 11.

FIG. 1 shows a block diagram of the major components of an apparatus for inventory, sale, and delivery of digitally transferable goods according to the present invention, which may be alternatively designated an inventory, sales, and delivery system, or simply "system". A storage and distribution means 100 is shown connected to inventory upload means 200, product information download means 300, order upload means 400, and delivery download means 500, shown in greater detail in FIGS. 2 through 5, respectively. Storage and distribution means 100 may preferably comprise at least one network server computer connected to network, such as the Internet. Network connections to inventory upload means 200, product information download means 300, order upload means 400, and delivery download means 500 may comprise hardware and/or software, including user interface hardware and/or software, for allowing access to the server by providers, shoppers, and/or buyers over the network using network browser software or other network access hardware and/or software. The nature of this access is described in further detail hereinbelow. The storage and distribution means stores the digital goods to be offered for sale, product information pertaining thereto, and may store marketing information and/or sales information.

Figure 2:
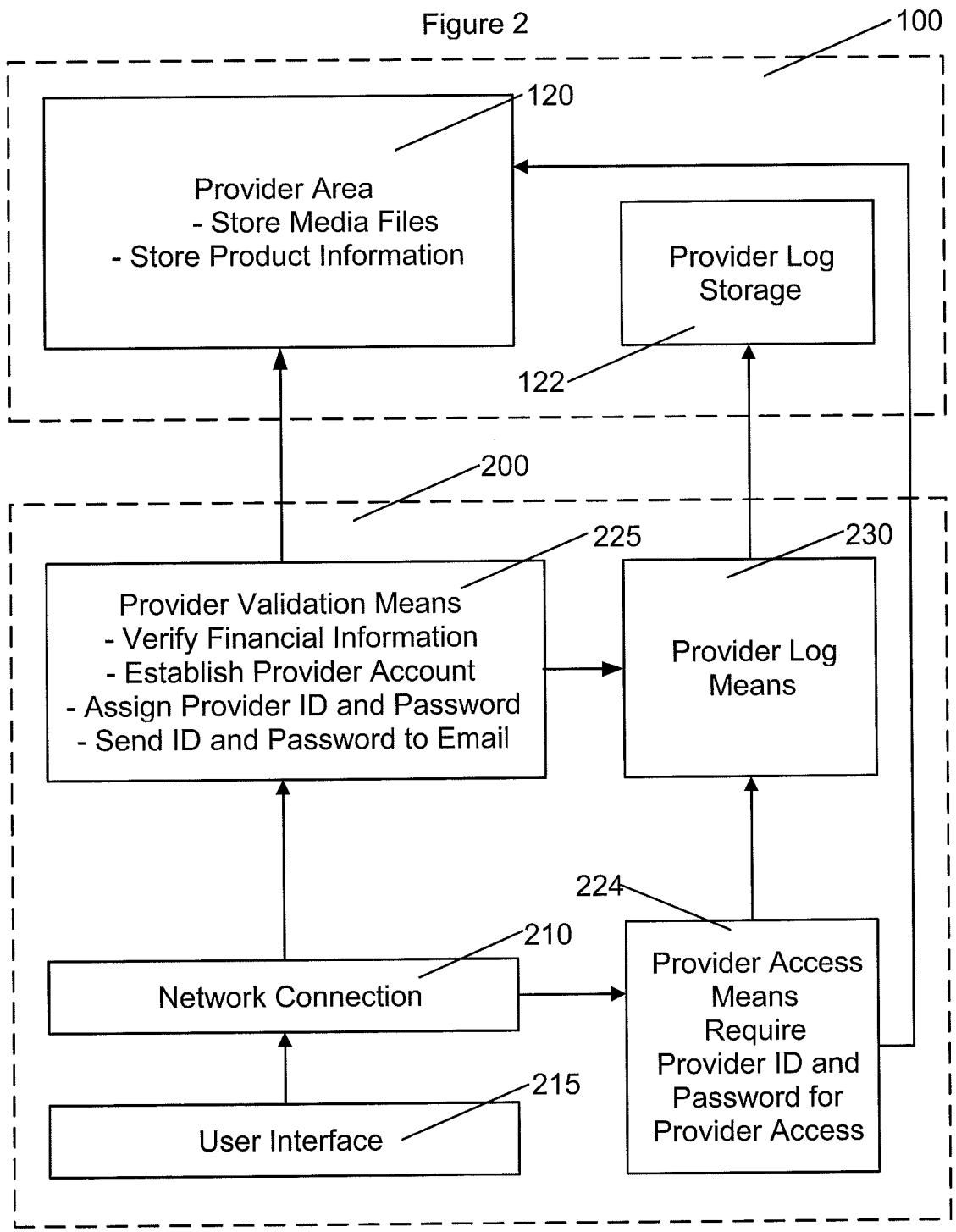
FIG. 2 shows a block diagram of an inventory upload means according to the present invention.
Figure 6:
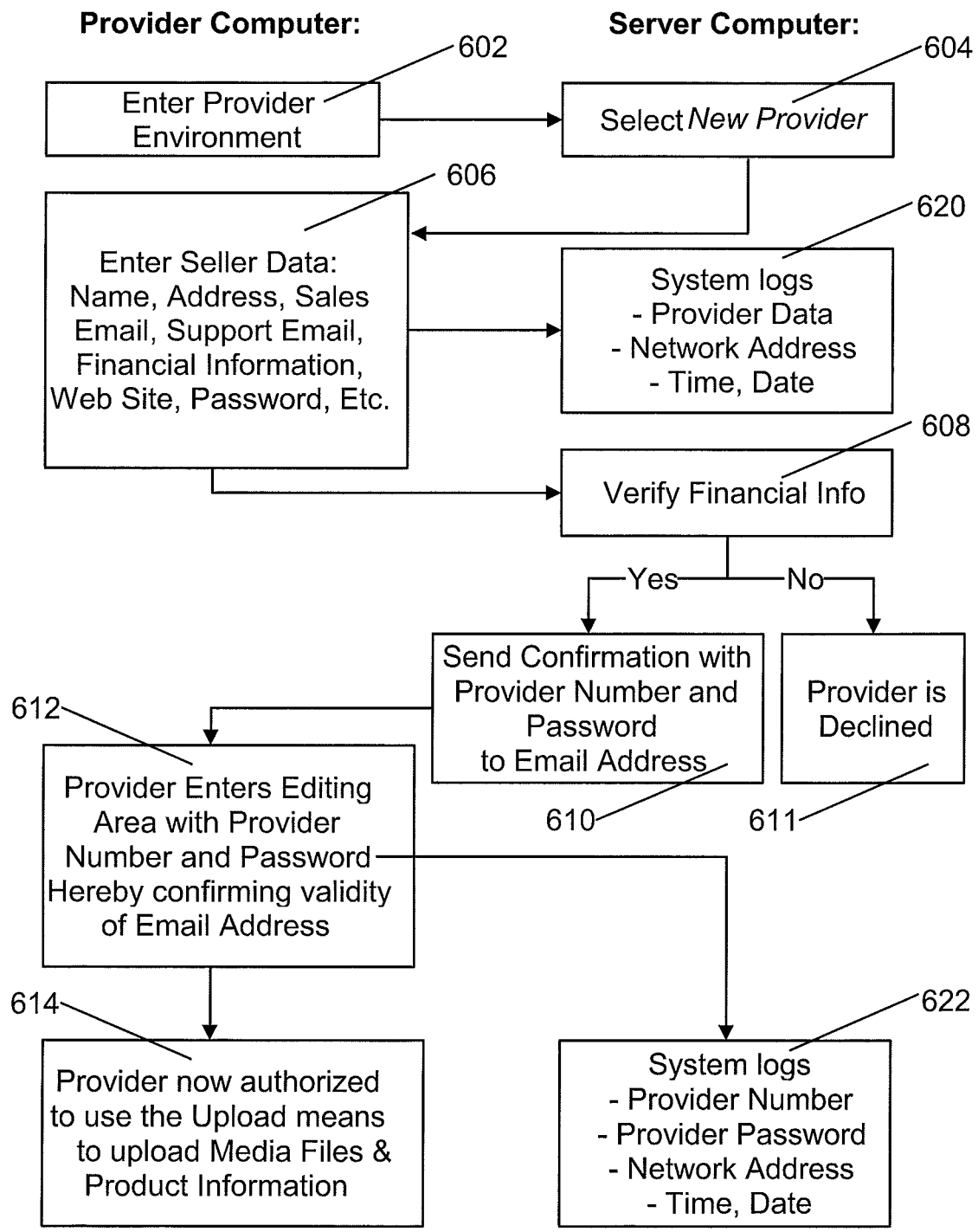
FIG. 6 shows a flow diagram of a provider validation procedure according to the present invention.

Inventory upload means 200 is depicted schematically in FIG. 2, and comprises a network connection 210 (including user interface 215), provider validation means 225, provider access means 224, and provider log means 230. The server network connection and associated software for processing network-borne requests for information and/or files may preferably serve as network connection 210, allowing remotely located providers having connections to the network to gain access to provider areas of the storage and distribution means via user interface 215. The procedures followed by a new provider are depicted in the flow diagram FIG. 6. New providers must first be accepted by provider validation means 225, which comprises hardware and/or software for establishing a provider account, assigning provider account identification data (account name or account number, for example), and assigning a provider password. In this way access to the provider account and any goods and/or product information stored therein may be restricted. In a preferred embodiment of the present invention, a provider who wishes to offer digitally transferable goods for sale must access the network site (a website, for example) of the storage and distribution means to establish a provider session at 602 and enter a "New Provider" area at 604. At 606, the provider may be prompted to enter identification information, which may include name, physical address, an electronic mail address, and/or other information such as an address for an Internet website, phone number, fax number, etc. The provider may also be required to submit financial information, such as a bank account number or credit card number. If provider validation means 225 verifies the financial information at 608, then provider validation means 225 establishes a provider account and sends, at 610, the provider account identification data and provider password to the electronic mail address supplied by the provider. The provider identification data and/or provider password may be generated by the system, or selected by the provider, or a combination thereof. Information pertaining to this process, including but not limited to date/time/network address, provider identification information, and provider financial information, may be logged at 620 by provider log means 230 and stored in provider log storage 122 of storage and distribution means 100, thereby allowing a system administrator to detect and/or prevent fraudulent access to the provider account. Provider access to the provider account at 612 via provider access means 224 (and logged at 622) serves as confirmation of the electronic mail address (since the provider account identification data and provider password were sent there, and required for provider access), so at least three pieces of confirmed data (financial information, electronic mail address, date/time/network address) may be available to track a provider, if necessary. If the financial information is invalid, the provider is denied access at 611 by provider validation means 225.

Figure 7:
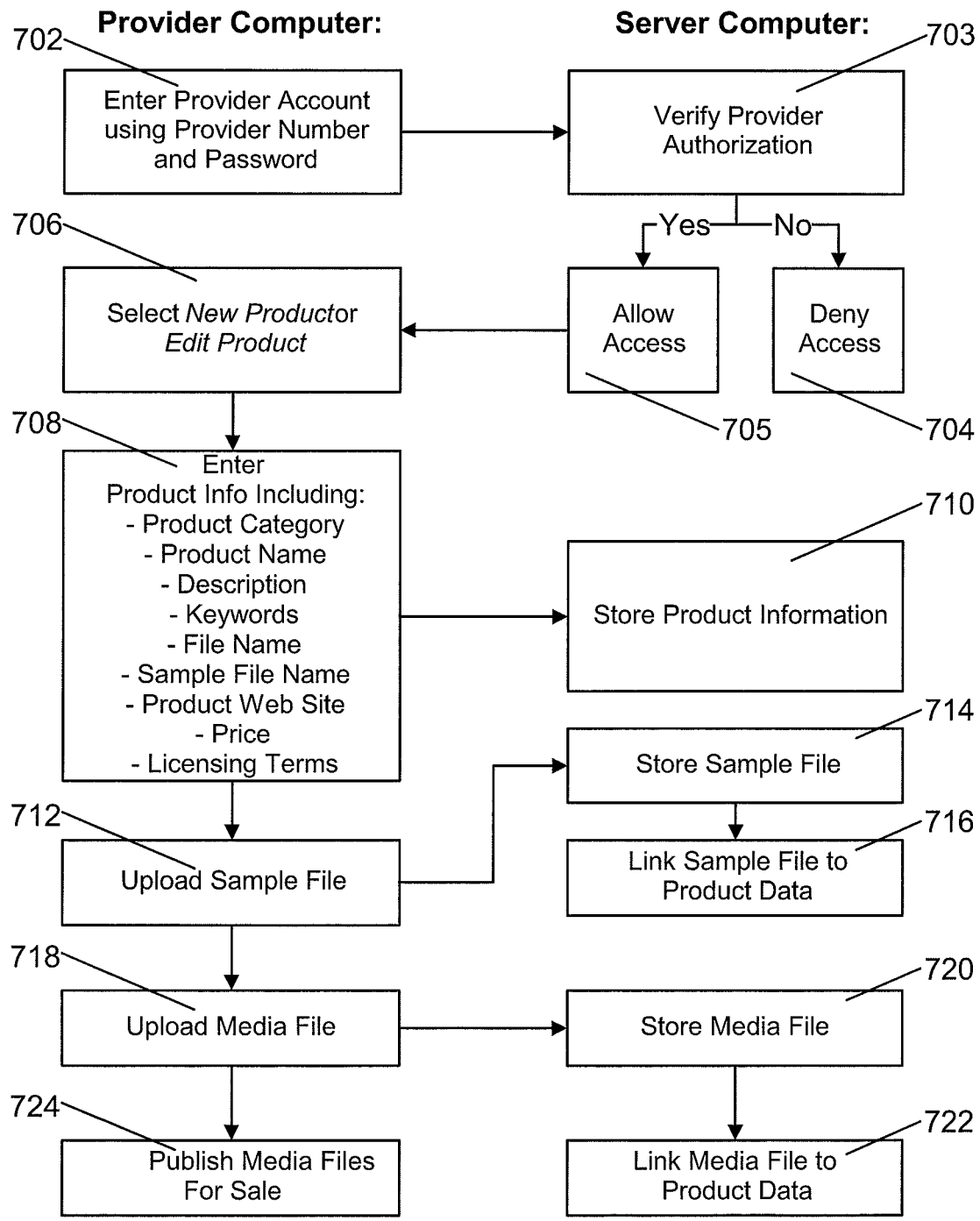
FIG. 7 shows a flow diagram of an inventory upload procedure according to the present invention.

Once a provider account is established and the provider account identification data and provider password have been received by the provider via electronic mail, the provider may establish a provider session and gain access to his/her area of storage and distribution means 100 by supplying the account identification information and password to provider access means 224 at 702 of FIG. 7. The provider may enter a "New Product" area or a "Edit Product" area at 706 and upload goods to be sold (718), and product information pertaining thereto (708, 712), to provider area 120 of storage and distribution means 100. The product information may include, but is not limited to, file name for the goods, product sample(s), file name(s) for sample(s), key words, product category, product description, product licensing terms, related information including Web page addresses, and/or pricing information. This product information may be combined (at 710) with product information from other providers into a common database, thereby enabling the product information of a plurality of providers to be simultaneously searched by a shopper. Storage and distribution means 100 may further provide links from the product information in such a database to the corresponding digitally stored goods (716) and samples (722). This entire procedure may be done in two steps, with the product information being uploaded to a restricted area of the provider account and the appropriate links established before publication of the product information in the shopper-searchable database. During the provider session, a provider may also retrieve previously-generated marketing and/or sales information pertaining to his/her goods. All such activity may be logged by provider log means 230, which may record provider account identification data, provider password, date/time/network address, and/or a list of goods and/or product information uploaded and/or modified, and this provider log information may be stored in provider log storage 122 of storage and distribution means 100.

All of the procedures described above may be carried out automatically by the storage and distribution means 100 and the inventory upload means 200, by implementation of the appropriate hardware, software, and/or combination thereof. All of the procedures described above may be performed during a single provider session, or may be performed during a plurality of temporally discontinuous sessions.

Figure 3:
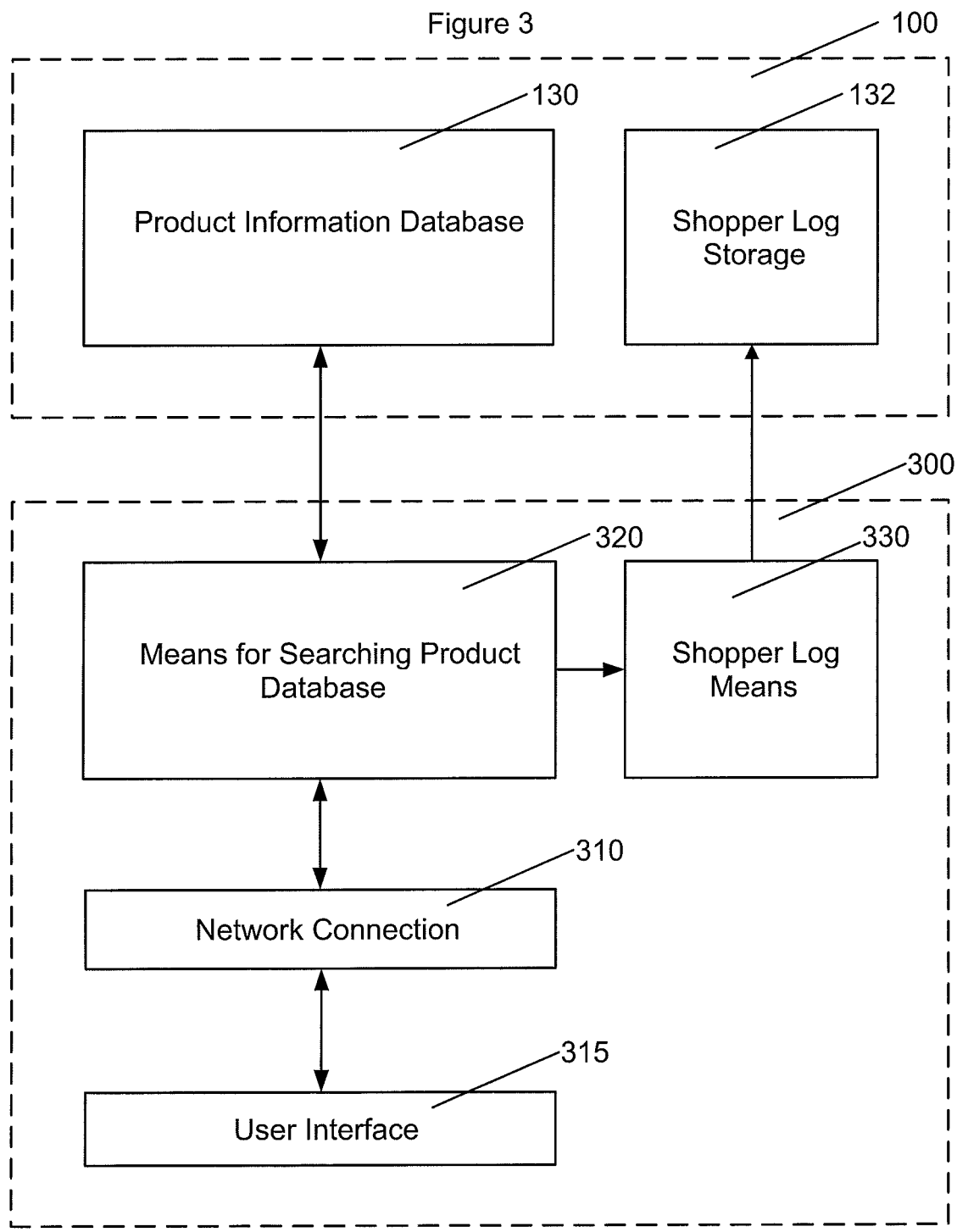
FIG. 3 shows a block diagram of a product information download means according to the present invention.
Figure 8:
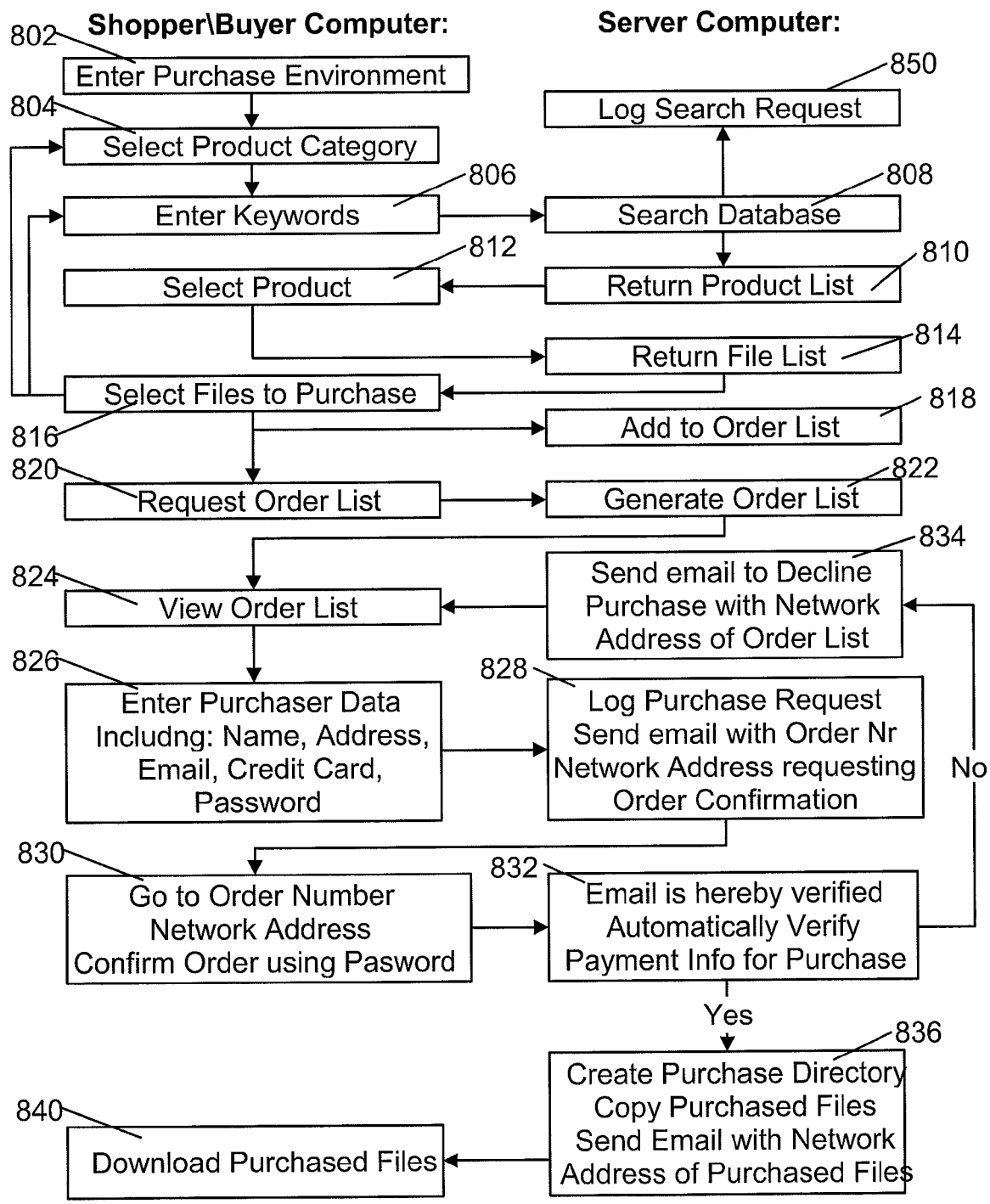
FIG. 8 shows a flow diagram of a product information download procedure, an order upload procedure, and a delivery download procedure according to the present invention.

Product information download means 300 is depicted schematically in FIG. 3, and comprises a network connection 310 (including user interface 315), product information search means 320, and shopper log means 330. The server network connection and associated software for processing network-borne requests for information and/or files may preferably serve as network connection 310, allowing remotely located shoppers having connections to the network to gain access to product information database 130. The procedures followed by a shopper are depicted in the flow diagram of FIG. 8. In a preferred embodiment of the present invention, a shopper who wishes to search for digitally transferable goods for potential purchase must access the network site of the storage and distribution means (a website, for example), establish a shopper/buyer session (or purchase session), and enter a "Purchase" area at 802. The shopper may select a product category at 804 and enter keywords and/or other search parameters at 806. The product information database 130 is queried at 808 and a list of goods is generated at 810. One or more of these goods may be selected for potential purchase at 812, a list of relevant files produced at 814, and files selected for purchase at 816. The entire search procedure may be repeated, and additional files selected for purchase. The date/time/network address, a list of queries and/or goods, and/or a shopper electronic mail address may be logged by shopper log means 330 and stored on storage and distribution means 100 at shopper log storage 132. This logged information may be made accessible to providers as marketing information.

All of the procedures described above may be carried out automatically by the storage and distribution means 100 and the product information download means 300, by implementation of the appropriate hardware, software, and/or combination thereof. All of the procedures described above may be performed during a single shopper/buyer session, or may be performed during a plurality of temporally discontinuous sessions.

Figure 4:
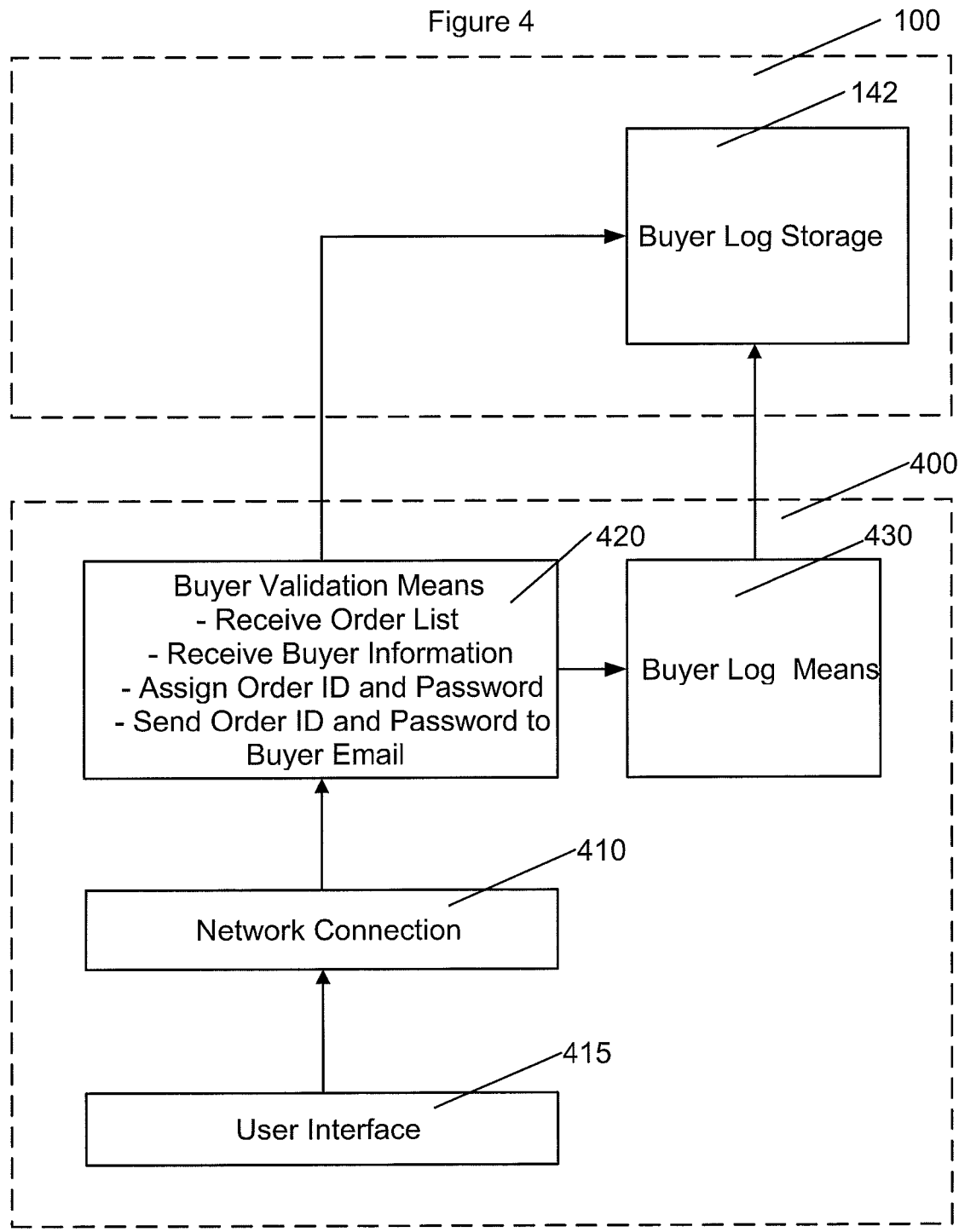
FIG. 4 shows block diagram of an order upload means according to the present invention.

Order upload means 400 is depicted schematically in FIG. 4, and comprises a network connection 410 (including user interface 415), buyer validation means 420, and buyer log means 430. The server network connection and associated software for processing network-borne requests for information and/or files may preferably serve as network connection 410, allowing remotely located buyers having connections to the network to gain access to storage and distribution means 100. The procedures followed by a buyer are depicted in the flow diagram of FIG. 8. In a preferred embodiment of the present invention, a shopper (soon-to-be buyer) who has accessed the network site of storage and distribution means 100 (a website, for example), established a shopper/buyer session, entered the "Purchase" area at 802, and selected one or more digitally transferable goods for potential purchase, may request, generate, and view an order list at 820, 822, and 824, respectively. The buyer may be prompted at 826 for buyer identification information, a buyer electronic mail address, and/or buyer financial information. These may be transmitted to buyer validation means 420 at 828, and buyer validation means 420 may send order identification data and/or an order password to the buyer electronic mail address. The order identification data and/or order password may be generated by the system, selected by the buyer, or a combination thereof. The buyer identification information, buyer electronic mail address, date/time/network address, and/or order information may be logged by buyer log means 430 and stored in buyer log storage 142 of storage and distribution means 100. This logged information may be made accessible to providers as sales information. The buyer may be required to use the order identification data and/or order password (sent to the buyer electronic mail address) to confirm the order at 830, thereby also confirming the buyer electronic mail address. Buyer validation means 420 may verify buyer financial information at 832. If the financial information is confirmed, the order may be further processed for delivery by delivery download means 500. If verification of the financial information is attempted but the financial information is not confirmed, the order may be refused at 834.

All of the procedures described above may be carried out automatically by the storage and distribution means 100 and the order upload means 400, by implementation of the appropriate hardware, software, and/or combination thereof. All of the procedures described above may be performed during a single shopper/buyer session, or may be performed during a plurality of temporally discontinuous sessions.

Figure 5:
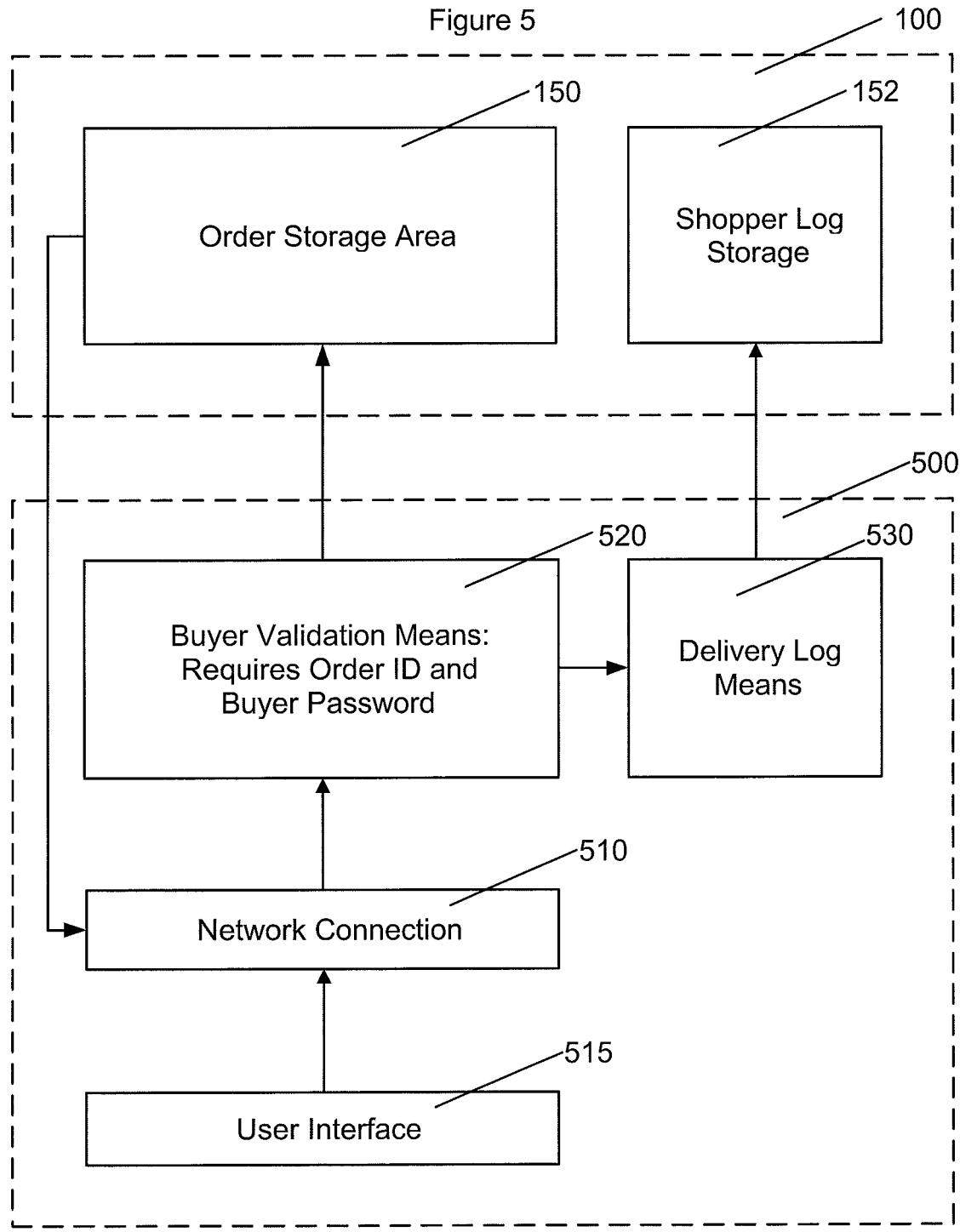
FIG. 5 shows a block diagram of a delivery download means according to the present invention.

Delivery download means 500 is depicted schematically in FIG. 5, and comprises a network connection 510 (including user interface 515), buyer validation means 520, and delivery log means 530. The server network connection and associated software for processing network-borne requests for information and/or files may preferably serve as network connection 510, allowing remotely located buyers having connections to the network to gain access to storage and distribution means 100. The procedures followed by a buyer are depicted in the flow diagram of FIG. 8. An order directory may be created at 836 in an order storage area 150 of storage and distribution means 100, and the location/network address of the order directory is sent to the buyer electronic mail address at 836. The buyer then accesses the network site of storage and distribution means 100 (a website, for example), establishes a delivery session, and enters the order storage area at 840 to download the purchased goods. Confirmation by buyer validation means 520 of the order identification data and/or the order password generated and transmitted at 828 and confirmed at 830. The buyer identification information, buyer electronic mail address, Date/time/network address, and/or order information may be logged by delivery log means 530 and stored in delivery log storage 152 of storage and distribution means 100. This logged information may be made accessible to providers as sales information.

Delivery download means 500 may further comprise means for allowing return of purchased goods by the buyer. Buyer validation means 520 may be utilized to verify buyer identification and/or financial information and the order identification information and password. Once these are verified, the buyer may return unwanted goods previously purchased.

All of the procedures described above may be carried out automatically by the storage and distribution means 100 and the delivery download means 500, by implementation of the appropriate hardware, software, and/or combination thereof. All of the procedures described above may be performed during a single delivery session, or may be performed during a plurality of temporally discontinuous sessions.

Figure 9:
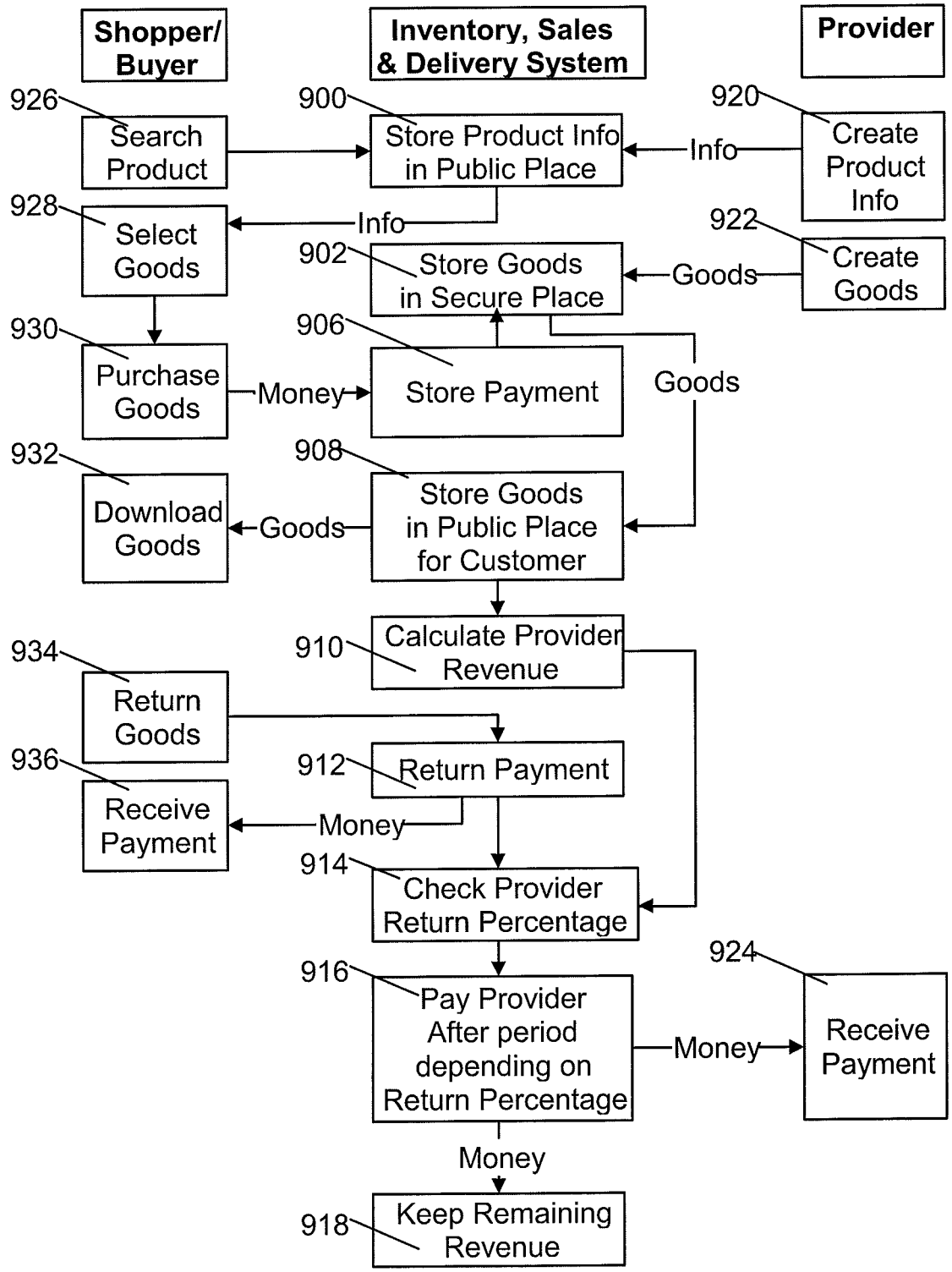
FIG. 9 shows flow diagram of overall flow of goods, product information, and payments according to the present invention.

FIG. 9 is a flow diagram depicting the overall flow of goods, product information, and payments. Providers create goods and accompanying product information at 922 and 920, respectively. These are uploaded and stored in the system at 902 and 900, respectively. A shopper may search the product information at 926 and receive requested information at 928, from which goods for purchase may be selected. Once an order has been placed and confirmed at 930, the system requests and stores a record of a payment or payment authorization from the buyer at 906, and delivers the purchased goods at 908 to the buyer at 932. Within a specified period of time, the buyer may return the goods at 934 and receive a refund or refund authorization at 912 and 936. If the specified return period has passed without a return, a payment to the provider is made or authorized after a waiting period. The amount of the purchase price to be retained by the system is calculated at 910, the waiting period may be determined at 914 based on the rate of returned goods for the provider, the payment authorized at 916 and received by the provider at 924, and the fraction of the purchase price retained by the system is kept at 918.

Without departing from inventive concepts disclosed and/or claimed herein, any form of electronic payment authorization may be utilized for receiving payment from buyers, providing refunds to buyers, and providing payment to providers. These may include but are not limited to: credit card payments/credits, bank drafts, electronic fund transfers, checks, various forms of computer network payment methods (CyberCash® and DigiCash®, for example). Electronic payment methods, which can be processed rapidly, can be automated, and are particularly well-suited for use in a computer- or computer-network-based environment, may be most preferred for the system as described herein.

Figure 10:
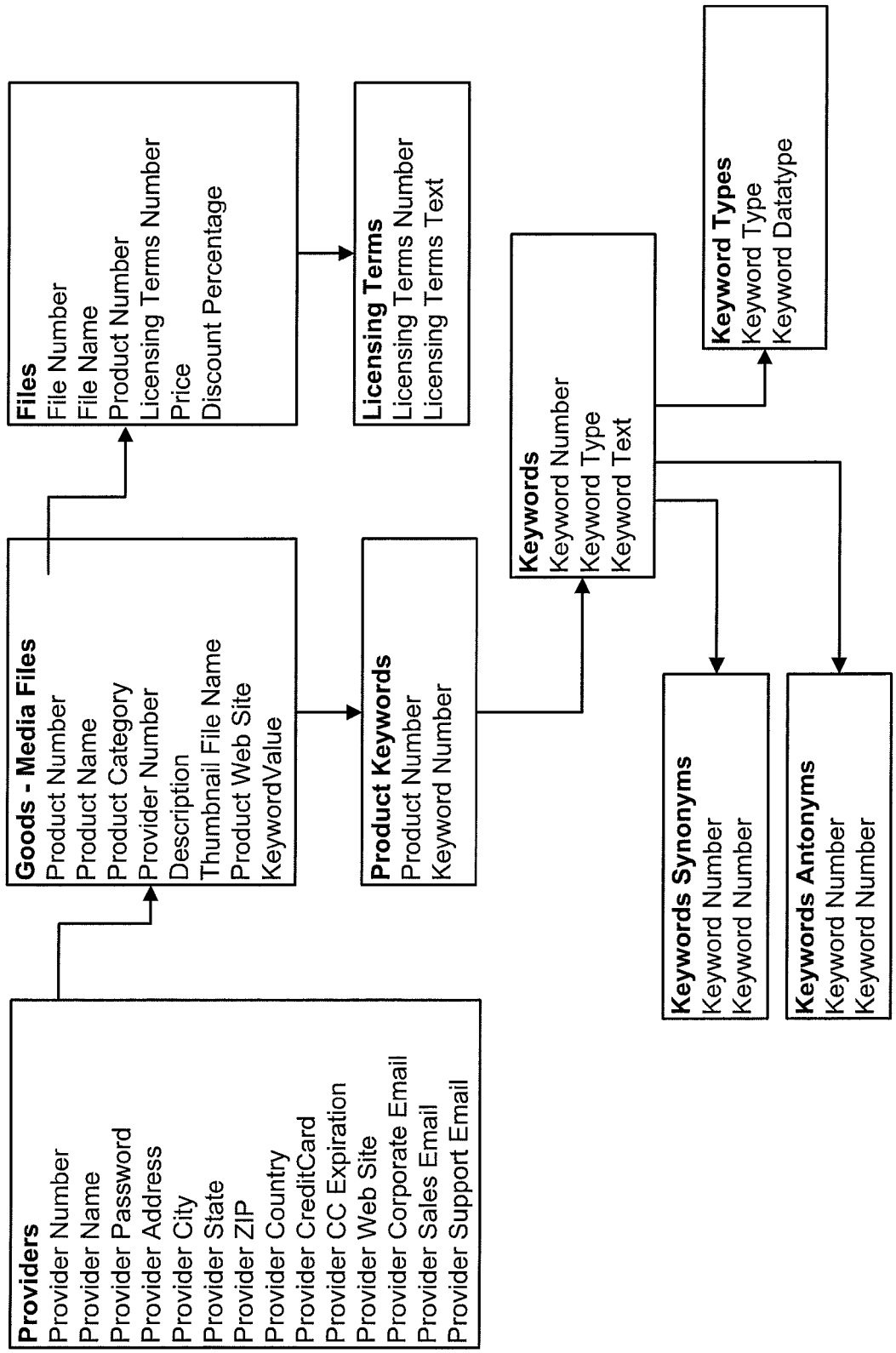
FIG. 10 shows a block diagram of an exemplary product information database according to the present invention.
Figure 11:
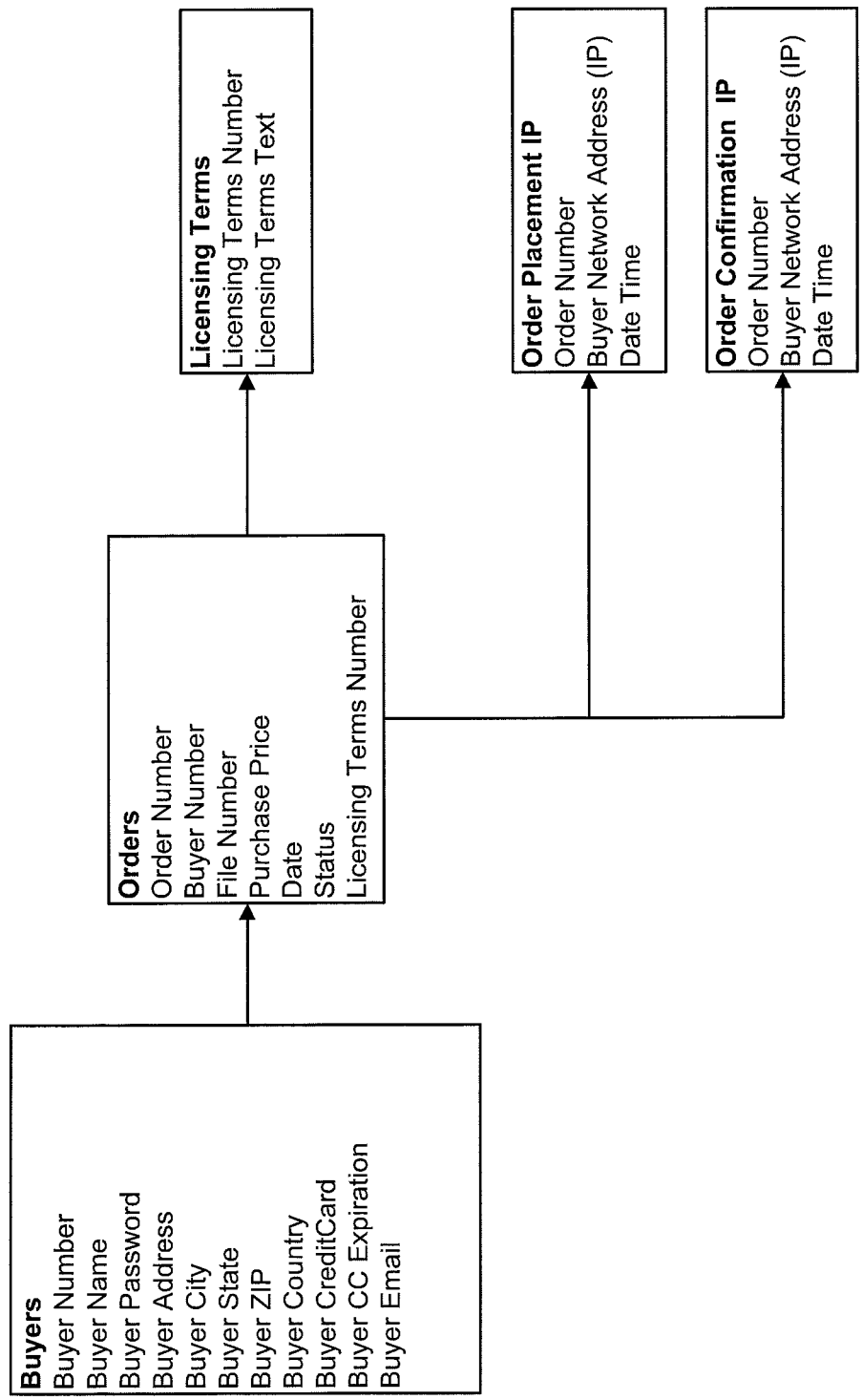
FIG. 11 shows a block diagram of an exemplary sales information database according to the present invention.
Figure 12:
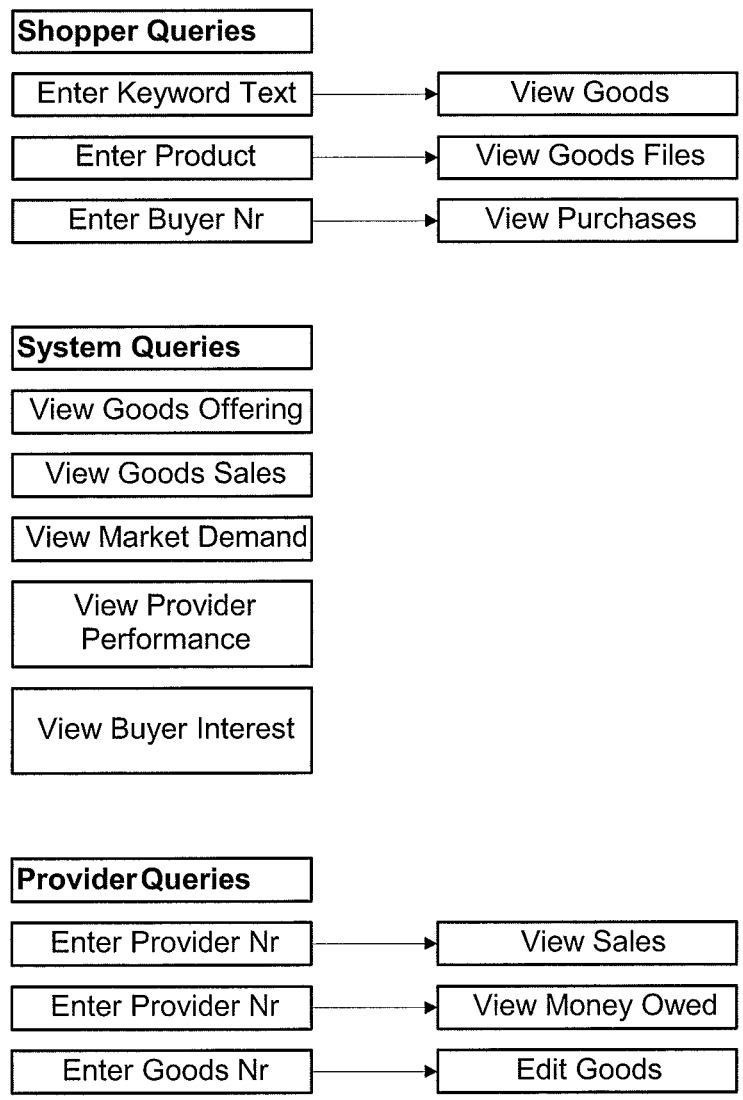
FIG. 12 shows a flow diagram of product, marketing, and sales information database queries according to the present invention.

Without departing from inventive concepts disclosed and/or claimed herein, the product information may be stored and/or presented to shoppers and/or buyers in any format suitable for searching. In particular, a preferred format may be that of a searchable database. Similarly, provider, order, marketing, and/or sales information may also be stored in a searchable format, preferably as a searchable database. FIG. 10 shows a block diagram of an exemplary set of database fields for provider and product information, one or more of which may be stored as the product and/or provider information in an embodiment of the present invention. Similarly, FIG. 11 shows a block diagram of an exemplary set of database fields for order, marketing, and sales information, one or more of which may be stored as the order, marketing, and/or sales information in an embodiment of the present invention. FIG. 12 is a block diagram showing exemplary queries that may be made of these databases. The provider database may be made accessible to a system administrator, and portions thereof pertaining to a provider made accessible thereto. Likewise, marketing and/or sales information may be made accessible to the system administrator, portions thereof pertaining to a provider made accessible thereto, and portions thereof pertaining to a buyer made accessible thereto. Such databases may be used, for example, to track return rates for goods of a provider, return rates for goods of a buyer, search data of a shopper or buyer, and other relevant information. Such tracking may be used, for example, to: refuse further access to the system to a provider with a rate of returned goods above a provider return threshold rate; to refuse further purchases from a buyer with a rate of returned goods above a buyer return threshold rate; refuse access to providers and/or buyer who have been detected using or attempting to use the system fraudulently; to track buyer purchase activity; and/or to generate targeted offerings of goods and send them to targeted electronic mail addresses. Other uses of the provider, marketing, and/or sales information may be devised without departing from inventive concepts disclosed and/or claimed herein.

The present invention has been set forth in the forms of its preferred and alternative embodiments. It is nevertheless intended that modifications to the disclosed apparatus and methods for inventory, sales, and distribution of digitally transferable goods may be made without departing from inventive concepts disclosed and/or claimed herein. For example, steps recited in the various procedures disclosed herein may in some cases be performed in different order without departing from inventive concepts disclosed and/or claimed herein. While not limited to a particular embodiment, the present invention has been described primarily in terms of one or more servers connected to the Internet, with access by providers, shoppers, and/or buyers provided by Internet browser software on remote networked computers, electronic mail, and user interface hardware/software. Given the rapidly evolving nature of the Internet, computers and computer networks in general, electronic mail, and software pertaining thereto, it is to be expected that apparatus, methods, hardware, and software for implementing network connections and digital data transfer will shortly be drastically different from their current forms. Nevertheless, even in these potentially unrecognizable forms, such apparatus, methods, hardware, and/or software may be used to implement the present invention without departing from inventive concepts disclosed and/or claimed herein.

For purposes of the present disclosure and appended claims, the conjunction "or" is to be construed inclusively (e.g., "a dog or a cat" would be interpreted as "a dog, or a cat, or both"), unless: (i) it is explicitly stated otherwise, or (ii) two or more of the listed alternatives are mutually exclusive within the particular context, in which case "or" would encompass only those combinations involving non-mutually-exclusive alternatives.

What is claimed is:

1. A method comprising:
   storing, on a server, a digital good of a digital goods provider; for the digital goods provider, providing access to product information related to the digital good, and providing for modification of the product information related to the digital good;
   receiving, from a shopper, a request for the product information; transmitting to the shopper, at least a portion of the product information; receiving, from the shopper, a request to purchase the digital good; and
   transmitting, by a processor and to the shopper from the server, a copy of the digital good identified in the request to purchase the digital good.

2. The method of claim 1, further comprising:
   receiving, from the digital goods provider, the digital good; and
   receiving, from the digital goods provider, the product information related to the digital good.

3. The method of claim 1, further comprising:
   establishing, by one or more servers, common administrative control of uploading of the digital good to the server.

4. The method of claim 3, further comprising:
   wherein the common administrative control of uploading the digital good includes validating the digital goods provider to restrict access to a corresponding assigned provider area of the server.

5. The method of claim 1, wherein the digital good comprises one or more of: a music file, a book file, a video file, or executable code in digitally transferable form.

6. The method of claim 1, further comprising:
   storing the product information related to the digital good on a second server; and
   wherein the providing access further comprises establishing, via a computer network, a provider session during which the digital goods provider can access the product information related to the digital good.

7. The method of claim 1, further comprising:
   accepting, via a computer network and from the digital goods provider, updates to one or more of the digital good or the product information related to the digital good.

8. The method of claim 1, further comprising:
   accepting, via a computer network and from the digital goods provider, an instruction to delete one or more of the digital good or the product information related to the digital good.

9. A method comprising:
   storing, on a server, a first digital good of a first digital goods provider in a first provider area associated with the first digital goods provider;
   storing, on the server, a second digital good of a second digital goods provider in a second provider area associated with the second digital goods provider;
   providing access to product information related to the first digital good and product information related to the second digital good;
   receiving, from a shopper, a request for the product information related to the first digital good or the product information related to the second digital good; and
   transmitting, by a processor and to the shopper, at least a portion of the product information related to the first digital good or the product information related to the second digital good.

10. The method as recited in claim 9, further comprising:
    receiving, from the shopper, a request to purchase the first digital good or the second digital good; and transmitting, to the shopper and from the server, a copy of the first digital good or a copy of the second digital good identified in the request to purchase the first digital good or the second digital good.

11. The method as recited in claim 10, further comprising:
receiving, from the digital goods provider, the first digital good and the second digital good; and
receiving, from the digital goods provider, the product information related to the first digital good and the product information related to the second digital good.

12. The method as recited in claim 9, further comprising:
establishing, by one or more servers, common administrative control of uploading of the first digital good and the second digital good to the server, wherein the common administrative control of uploading the first digital good and the second digital good includes:
validating the first digital goods provider to restrict access to the first provider area of the server; and
validating the second digital goods provider to restrict access to the second provider area of the server.

13. The method as recited in claim 9, further comprising:
accepting, via a computer network and from the first digital goods provider or the second digital goods provider, updates to one or more of the first digital good, the product information related to the first digital good, the second digital good, or the product information related to the second digital good.

14. The method as recited in claim 9, further comprising:
accepting, via a computer network and from the first digital goods provider or the second digital goods provider, an instruction to delete one or more of the first digital good, the product information related to the first digital good, the second digital good, or the product information related to the second digital good.

15. One or more non-transitory computer-readable media storing computer-executable instructions that, when executed by one or more processors, cause the one or more processors to perform operations comprising storing a digital good of a digital goods provider; for the digital goods provider, providing access to product information related to the digital good, and providing for modification of the product information related to the digital good;
receiving, from a shopper, a request for the product information; transmitting to the shopper, at least a portion of the product information; receiving, from the shopper, a request to purchase the digital good; and
transmitting, to the shopper and from the server, a copy of the digital good identified in the request to purchase the digital good.

16. The one or more non-transitory computer-readable media as recited in claim 15, wherein the operations further comprise:
establishing common administrative control of uploading the digital good to a provider area of a server, the common administrative control restricting access to the provider area to the digital goods provider.

17. The one or more non-transitory computer-readable media as recited in claim 15, wherein the operations further comprise:
establishing common administrative control of one or more of the digital good or the product information related to the digital good, the common administrative control restricting access to the digital goods provider and a service provider associated with a server that stores the digital good and the product information related to the digital good.

18. The one or more non-transitory computer-readable media as recited in claim 15, wherein the operations further comprise:
accepting, via a computer network and from the digital goods provider, an instruction to update, modify, or to delete one or more of the digital good or the product information related to the digital good.

19. The one or more non-transitory computer-readable media as recited in claim 15, wherein the operations further comprise:
receiving, from the digital goods provider, the digital good; and
receiving, from the digital goods provider, the product information related to the digital good.

20. The one or more non-transitory computer-readable media as recited in claim 15, wherein the operations further comprise:
storing, on a server, the digital good and the production information related to the digital good in a provider area that is associated with the digital goods provider, the server including multiple provider areas that are each associated with a different digital goods provider.

* * * * *